Patented June 10, 1924.

1,497,649

UNITED STATES PATENT OFFICE.

CARL MARX, OF WYOMING, NEW JERSEY, ASSIGNOR TO UNION SULPHUR COMPANY, A CORPORATION OF NEW JERSEY.

MANUFACTURE OF SULPHUR.

No Drawing.     Application filed May 5, 1922.  Serial No. 558,766.

*To all whom it may concern:*

Be it known that I, CARL MARX, a citizen of the United States, and a resident of Wyoming, Milburn Township, Essex County, New Jersey, have invented a new and useful Improvement in the Manufacture of Sulphur, of which the following is a specification.

This invention has for one of its principal objects the manufacture of purified and finely divided sulphur, in which the relative fineness may be varied within comparatively wide limits at will, and where the individual sulphur particles and crystals are more uniform in size than those obtained by the usual methods of grinding. In the usual practice of preparing sulphur of predetermined fineness, it is customary to grind the material, and often the danger of fire and explosion incident to the grinding operation is sought to be minimized by conducting the operation in the presence of an inert gas as flue gas, one serious drawback to this method being that a powder is formed of widely varying degrees of fineness, so that there is no uniformity in the state of subdivision of sulphur by grinding.

In contradistinction to this, I have found that by melting sulphur in the presence of liquid and solid solvents of the same, employing for instance, aromatic hydrocarbons and hydrocarbon mixtures, and especially where the liquid hydrocarbon or other liquid is an excellent solvent for the hydrocarbon added but a poor solvent for sulphur, I am able to obtain at will, sulphur of many degrees of fineness by mere precipitation. For instance, when employing naphthalene as the solid aromatic hydrocarbon, and toluene or equivalent liquid as the fluid hydrocarbon, the fineness of subdivision of sulphur particles is roughly proportional to the amount of hydrocarbon or hydrocarbons present in the mixture. I am therefore able to obtain many degrees of fineness of sulphur by precipitation, by varying the nature and proportion of sulphur solvents added to the sulphur before precipitation of the former. When employing 50 parts by weight of sulphur to 50 parts of hydrocarbon as naphthalene, and in the presence of a relatively small amount of liquid hydrocarbon as benzene, toluene, xylene or paraffin hydrocarbons, and proceeding according to my invention, I am able to produce sulphur exceeding 500 mesh in fineness, the fineness gradually diminishing with reduction of liquid and solid hydrocarbons in the above formula, until when the amount of naphthalene reaches 10 parts to 50 parts of sulphur, the fineness is reduced to around 150 mesh, and can be still further reduced by diminishing the amount of solid hydrocarbon added. On the other hand by increasing the amount of hydrocarbon to twice that of sulphur, the precipitated sulphur obtained may be made so fine that it will run through filter paper which will retain precipitates of barium sulfate or calcium oxalate. It will be seen, therefore, that by the proper manipulation of the two classes of components in my process in addition to the sulphur, it becomes possible to prepare sulphur in a purified form, and of a desired degree of fineness between the exceedingly fine, so-called colloid sulphur to the product of 100 mesh or less.

As a relatively high solvent of sulphur, I prefer to employ a solid hydrocarbon as naphthalene, lowering its melting point and hence facility of manipulation, by incorporating with the naphthalene a liquid solvent of the same which at the same time is a poor solvent for sulphur, toluene being such a liquid. The liquid added is relatively small in comparison to the solid hydrocarbon, both liquid and solid hydrocarbons exerting an effect upon the fineness of the sulphur precipitated from mixtures of the same. The liquid which is a solvent of the solid hydrocarbon and a poor solvent of sulphur, must be non-aqueous, of boiling point preferably above that of water and below the melting point of sulphur, toluene being adapted for this purpose. By the addition of 5% to 20% of toluene based upon the amount of naphthalene employed, I am able to fuse the sulphur and naphthalene together at a comparatively low temperature, and afterwards precipitate the sulphur from the liquid melt by pouring the same into a fluid which readily dissolves naphthalene but is a poor solvent of sulphur, toluene being again adapted for this purpose. Upon pouring such a clear solution containing toluene, naphthalene and sulphur into cold toluene, the sulphur precipitates immediately in a crystalline form, while the naphthalene goes directly into the toluene without passing from the liquid to the solid state, and hence the solution of the naphthalene in the toluene is rapid. When proceeding in this manner, it will be found that the fineness of the sulphur upon precipitation, is primarily dependent upon the proportion of naphthalene in combination with the sulphur before the melt is poured into the toluene, the more naphthalene to sulphur, the more finely divided will be the sulphur upon precipitation, and conversely. The freedom from naphthalene in the precipitated sulphur is dependent upon the volume and temperature of the sulphur precipitant and the thoroughness of agitation during precipitation.

As an example illustrative of carrying out on a commercial scale my process for purifying and subdividing sulphur, I may melt together in a appropriate closed container "A" with agitating device 100 pounds of sulphur with 10 to 100 pounds of naphthalene depending upon the fineness desired for the sulphur to be obtained, commercial amounts of toluene of from 5%–20% on the naphthalene being employed. In practice it has been found more convenient to first melt the naphthalene and toluene, and when the mass has become liquefied, add thereto in small portions, the sulphur, meanwhile agitating the mass. The melting point of the mixture is lowered by an increase of toluene, and also lowered,—but less so—by an increase in the proportion of naphthalene present. Excellent results have been obtained by me by keeping the temperature around 110° C., and agitating until a transparent, clear solution results. The insoluble and extraneous matter may be removed if desired, by filtration through a heated filtering system, and the mass, still liquid is then poured into four times the bulk of toluene based on the amount of naphthalene used. This is a sufficient amount of toluene so that the temperature does not rise to a point where there is serious volatilization and loss of toluene, and also a comfortable excess of toluene so the saturation point of naphthalene in toluene is not reached. Under these conditions the mixture of toluene, sulphur and naphthalene deport themselves as follows: The toluene is dissipated in the larger bulk of toluene; the sulphur is precipitated in a uniformly crystallized condition; the liquid naphthalene immediately passes into solution in the toluene without solidifying, the temperature of the mixture after addition of all of the toluene-naphthalene-sulphur melt being around 45°, depending upon the temperature of the melt at the moment of precipitation, and the temperature and bulk of the precipitant of the sulphur. Therefore, the liquid into which the melt is to be poured, for best results must be an excellent solvent of the naphthalene or other hydrocarbon, and an excellent precipitant and non-solvent for the sulphur. During the precipitation of the sulphur, the mass is preferably agitated and the toluene likewise stirred vigorously.

The second step in the process is the separation of the sulphur from the liquid containing the dissolved solid hydrocarbon. The thoroughly admixed mass of precipitated sulphur and naphthalene dissolved in toluene may be discharged into a centrifugal, washed with portions of toluene until the naphthalene is removed to the desired point, the filtrate from the centrifugal being returned to a still and the toluene removed by simple distillation. The residue in the still of naphthalene containing small amounts of toluene may be blown while still liquid into tank "A" to dissolve more sulphur. The precipitated and purified sulphur from the centrifugal may be passed through a solvent recovery system, when it is ready for the market.

In preparing sulphur in a finely divided and purified form by my process, the sulphur to be purified is melted with a solid solvent of the same, as for instance naphthalene, the mass then being poured into a fluid such as toluene or other suitable hydrocarbon or liquid, said fluid being one which will dissolve the solid solvent of sulphur without its becoming solid, and at the same time precipitating the sulphur in a finely divided crystalline state of high purity.

I am aware that processes have been described in which sulphur and naphthalene are fused together and the fused mass is then allowed to become cold, and that naphthalene has been used for extracting sulphur from ores, &c., but it is to be understood that in my process best results are to be obtained by the use of a plurality of dissimilar hydrocarbons or other sulphur solvents and non-solvents in conjunction with sulphur which is to be purified and subdivided, and that what I desire to secure by Letters Patent is:—

1. In a process for preparing finely divided, purified sulphur, the step which includes melting sulphur and naphthalene together, and extracting the naphthalene therefrom without allowing the mass to become solid.

2. In a process for preparing finely divided, purified sulphur, the step which includes melting together sulphur and a plurality of hydrocarbons, and extracting the sulphur therefrom without allowing the mass to become solid.

3. A process for preparing finely divided sulphur in a purified form which consists in melting sulphur, naphthalene and another hydrocarbon together, and precipitating the sulphur therefrom by means of a sulphur non-solvent which is a naphthalene solvent, in such a manner that the naphthalene dissolves without becoming solid.

4. In a process for preparing finely divided sulphur; dissolving sulphur by heat with naphthalene and toluene, and precipitating the fused mass by introducing it into a naphthalene solvent which is a poor solvent of sulphur, the sulphur precipitating in a crystalline form, and the naphthalene passing into solution without becoming a solid.

5. In a process for dividing and purifying sulphur, the step which consists in melting the sulphur with a liquid and a solid, the solid being a solvent of the sulphur and the liquid being an excellent solvent of the solid but a poor solvent of sulphur; pouring the melt into a liquid which will precipitate the sulphur and cause the solid hydrocarbon to pass into solution without becoming solid.

6. The process of preparing sulphur in a finely divided and purified form, which consists in melting sulphur with a solid solvent of the same, and pouring the mass into a fluid which will dissolve the solid solvent without its becoming solid, at the same time precipitating the sulphur in a finely crystalline state, as specified.

7. In a process for finely dividing and purifying sulphur, the step which consists in melting sulphur together with a solid and a liquid, then pouring the melt into another liquid which will dissolve the solid sulphur solvent, and precipitate the sulphur in a finely divided crystalline state.

8. A process for preparing purified, finely divided sulphur, which consists in dissolving sulphur with naphthalene and toluene, and pouring the melt into cold toluene, and separating the naphthalene therefrom without allowing the mass to become cool.

9. A process for preparing purified sulphur of varying degrees of fineness, consisting of melting together 100 parts of sulphur, 10 to 100 parts of naphthalene (depending upon the degree of fineness of sulphur desired) and 1 to 10 parts of toluene, then pouring the melt into 200 parts of cold toluene with agitation, and separating the naphthalene therefrom without allowing the mass to become solid, the sulphur being precipitated by the toluene and removed therefrom by ways now known, substantially as specified.

This specification signed and witnessed this twenty-ninth day of April, 1922.

CARL MARX.

Witness:
LEO RUTSTEIN.